United States Patent
Shono et al.

(10) Patent No.: US 12,227,712 B2
(45) Date of Patent: Feb. 18, 2025

(54) REFRIGERATING MACHINE OIL, WORKING FLUID COMPOSITION FOR REFRIGERATING MACHINE, LUBRICATING METHOD, AND METHOD FOR PRODUCING REFRIGERATING MACHINE OIL

(71) Applicant: ENEOS CORPORATION, Tokyo (JP)

(72) Inventors: Yohei Shono, Tokyo (JP); Fumiyuki Nara, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 17/776,400

(22) PCT Filed: Nov. 13, 2020

(86) PCT No.: PCT/JP2020/042508
§ 371 (c)(1),
(2) Date: May 12, 2022

(87) PCT Pub. No.: WO2021/100634
PCT Pub. Date: May 27, 2021

(65) Prior Publication Data
US 2022/0411710 A1 Dec. 29, 2022

(30) Foreign Application Priority Data
Nov. 19, 2019 (JP) .................. 2019-208869

(51) Int. Cl.
*C10M 101/00* (2006.01)
*C10M 129/56* (2006.01)

(52) U.S. Cl.
CPC ........ *C10M 101/00* (2013.01); *C10M 129/56* (2013.01); *C10M 2209/086* (2013.01)

(58) Field of Classification Search
CPC .............. C10M 129/56; C10M 101/00; C10M 171/008; C10M 2203/1025; C10M 2209/086; C10M 2205/028; C10N 2040/30; C10N 2020/04; C10N 2030/06; C10N 2030/02; C10N 2020/103; C10N 2020/02; C09K 5/042
See application file for complete search history.

(56) References Cited

U.S. PATENT DOCUMENTS

| | | | |
|---|---|---|---|
| 3,915,871 A | 10/1975 | Bryer et al. | |
| 5,798,054 A | 8/1998 | Sato et al. | |
| 6,544,935 B1 * | 4/2003 | Vargo | C10M 143/00 508/471 |
| 2012/0329694 A1 * | 12/2012 | Gelder | C10M 119/24 508/468 |
| 2015/0376335 A1 | 12/2015 | Brule et al. | |
| 2016/0040089 A1 * | 2/2016 | Baker | C10M 157/04 508/306 |

FOREIGN PATENT DOCUMENTS

| | | |
|---|---|---|
| EP | 0 586 705 A1 | 3/1994 |
| EP | 3 546 551 A1 | 10/2019 |
| JP | H3-062894 A | 3/1991 |
| JP | H3-086796 A | 4/1991 |
| JP | H5-179275 A | 7/1993 |
| JP | H9-040981 A | 2/1997 |
| JP | 2016-516834 A | 6/2016 |
| JP | 2018-083920 A | 5/2018 |
| WO | 93/013185 A1 | 7/1993 |
| WO | 2005/012469 A1 | 2/2005 |
| WO | 2005/095562 A1 | 10/2005 |
| WO | 2009/148110 A1 | 12/2009 |
| WO | 2014/125219 A1 | 8/2014 |

OTHER PUBLICATIONS

ISR issued in INTERNATIONAL Patent Application No. PCT/JP2020/042508, Jan. 19, 2021, English translation.
IPRP issued in INTERNATIONAL Patent Application No. PCT/JP2020/042508, Jun. 2, 2022, English translation.
EESR issued in EP Patent Application No. 20890875.6, Dec. 9, 2022.
Office Action issued in IN Patent Application No. 202217031881, Feb. 13, 2024.

\* cited by examiner

*Primary Examiner* — Vishal V Vasisth
(74) *Attorney, Agent, or Firm* — Greenblum & Bernstein, P.L.C

(57) ABSTRACT

A refrigerating machine oil containing: a lubricating base oil; and a polymer additive, wherein a carbon residue of 10% residual oil is 0.05% by mass or more.

7 Claims, No Drawings

REFRIGERATING MACHINE OIL, WORKING FLUID COMPOSITION FOR REFRIGERATING MACHINE, LUBRICATING METHOD, AND METHOD FOR PRODUCING REFRIGERATING MACHINE OIL

This application is a 371 of PCT/JP2020/042508, filed Nov. 13, 2020

TECHNICAL FIELD

The present invention relates to a refrigerating machine oil, a working fluid composition for a refrigerating machine, a lubricating method and a method for producing refrigerating machine oil.

BACKGROUND ART

A refrigerating machine such as a refrigerator includes a refrigerant circulation system including a compressor, a condenser, an expansion mechanism (expansion valve, capillary), an evaporator, and the like, and heat exchange is performed by circulating a refrigerant in the refrigerant circulation system.

Compressors for refrigerating machines include rotary compressors, piston-crank compressors, and the like. For example, in a piston-crank compressor, a rotary motion of a motor is converted into a reciprocating motion by a connecting rod, and a piston coupled to the connecting rod is reciprocated to compress a refrigerant. The refrigerating machine oil is sealed in the compressor together with a refrigerant, and lubricates sliding members such as a connecting rod and a piston. As such a refrigerating machine oil, for example, Patent Document 1 below discloses a refrigerating machine oil containing a predetermined base oil, a phosphorus-based extreme pressure agent, and an ester-based additive.

CITATION LIST

Patent Document

[Patent Document 1] International Publication WO 2005/012469

SUMMARY OF INVENTION

Technical Problem

When the viscosity of the conventional refrigerating machine oil is reduced, for example, it is effective to reduce friction in a fluid lubrication region, but the effect of reducing friction cannot be sufficiently obtained in a region having a low sliding speed such as an elastic fluid lubrication region, a mixed lubrication region, or a boundary lubrication region, and there is still room for improvement in this respect. The present invention has been made in view of the above circumstances, and an object thereof is to provide a refrigerating machine oil having excellent friction characteristics in a lubrication region (an elastic fluid lubrication region or a mixed lubrication region) in which a friction coefficient rapidly increases as a sliding speed decreases, a working fluid composition for a refrigerating machine containing the refrigerating machine oil, a lubricating method using the refrigerating machine oil, and a method for producing the refrigerating machine oil.

Solution to Problem

In order to solve the above-described problem, the present inventors first found that in a refrigerating machine oil containing a polymer additive, a carbon residue of 10% residual oil is an index of friction characteristics. As a result of further studies based on such findings, the present inventors have found that the friction characteristics of a refrigerating machine oil can be improved by adjusting the carbon residue of 10% residual oil of the refrigerating machine oil, and have completed the present invention.

That is, the present invention provides a refrigerating machine oil containing: a lubricating base oil; and a polymer additive, wherein a carbon residue of 10% residual oil is 0.05% by mass or more.

In the present invention, the carbon residue of 10% residual oil means a value measured by a micro method in accordance with JIS K2270-2:2009.

The lubricating base oil may contain a mineral oil.

The polymer additive may be a (co)polymer derived from an unsaturated carboxylic acid ester.

The polymer additive may have a carbon residue of 0.2% by mass or more.

The present invention also provides a working fluid composition for a refrigerating machine containing: a refrigerant; and the refrigerating machine oil according to the present invention described above.

The present invention further provides a lubricating method containing using the refrigerating machine oil according to the present invention in a refrigerant circulation system containing a compressor, a condenser, an expansion mechanism, and an evaporator.

The present invention further provides a method for producing a refrigerating machine oil, containing mixing a polymer additive with a lubricating base oil such that a carbon residue of 10% residual oil of the refrigerating machine oil is 0.05% by mass or more.

Advantageous Effects of Invention

According to the present invention, it is possible to provide a refrigerating machine oil having excellent friction characteristics in a lubrication region (mixed lubrication region or the like) in which the friction coefficient rapidly increases as the sliding speed decreases, a working fluid composition for a refrigerating machine containing the refrigerating machine oil, a lubricating method using the refrigerating machine oil, and a method for producing the refrigerating machine oil.

DESCRIPTION OF EMBODIMENTS

Embodiments of the present invention will now be described in detail.

The refrigerating machine oil according to the present embodiment contains a lubricating base oil and a polymer additive. The refrigerating machine oil has a carbon residue of 10% residual oil of 0.05% by mass or more.

The lubricating base oil may be any of a mineral oil, a synthetic oil, or a mixture of both, but preferably contains a mineral oil from the viewpoint of exhibiting more excellent friction characteristics in a region where the sliding speed is low.

Examples of the mineral oil include a paraffinic mineral oil or a naphthenic mineral oil obtained by subjecting a lubricating oil fraction obtained by atmospheric distillation and vacuum distillation of crude oil to refining treatment such as solvent deasphalting, solvent extraction, hydrocracking, solvent dewaxing, catalytic dewaxing, hydrorefining, sulfuric acid washing, and clay treatment alone or in an appropriate combination of two or more thereof and paraffinic mineral oils are particularly suitably used. These mineral oils may be used alone or in combination of two or more thereof at an any ratio.

The mineral oil may have a ratio of % $C_P$ to % $C_N$ (% $C_P$/% $C_N$) of, for example, 0.2 or more, preferably 0.5 or more, more preferably 1 or more, and still more preferably 1.1 or more.

The paraffinic mineral oil may have a ratio of % $C_P$ to % $C_N$ (% $C_P$/% $C_N$) of preferably more than 1, more preferably 1.1 or more, and still more preferably 1.5 or more. When the % $C_P$/% $C_N$ of the paraffinic mineral oil is more than 1, the flash point (COC) is improved (for example, 100° C. or more, preferably 120° C. or more), and a refrigerating machine oil having more excellent friction characteristics can be obtained. In the present invention, % $C_P$ and % $C_N$ mean values measured by a method (n-d-M ring analysis) in accordance with ASTM D3238-95 (2010). The flash point (COC) means a flash point measured by the Cleveland open method in accordance with JIS K2265-4:2007.

When the lubricating base oil contains a mineral oil, the lubricating base oil may consist of only the mineral oil (i.e., the content of the mineral oil is 100% by mass based on the total amount of the lubricating base oil), and may further contain a base oil component other than the mineral oil. Examples of the base oil component other than the mineral oil include synthetic oils such as synthetic hydrocarbon oils and oxygen-containing oils. In this case, the content of the mineral oil may be 50% by mass or more, 70% by mass or more, or 90% by mass or more, based on the total amount of the lubricating base oil.

Examples of the synthetic hydrocarbon oil include an alkylbenzene, an alkylnaphthalene, a poly-α-olefin (PAO), a polybutene, and an ethylene-α-olefin copolymer.

Examples of the oxygen-containing oil include esters, ethers (for example, polyalkylene glycol (PAG), polyvinyl ether (PVE)), carbonates, ketones, silicones, and polysiloxanes. Examples of the ester include monoesters, polyol esters, aromatic esters, dibasic acid esters, complex esters, carbonic acid esters, and mixtures thereof. It is preferable to use a monoester of a monohydric aliphatic alcohol and a monocarboxylic fatty acid, and it is desirable to use a mixture of the monoester and a polyol ester of a di- to hexa-hydric alcohol and a monocarboxylic fatty acid as necessary. Examples of the monohydric aliphatic alcohol constituting the ester include monohydric aliphatic alcohols having 1 to 20 carbon atoms, preferably 4 to 18 carbon atoms, and more preferably 4 to 12 carbon atoms. Examples of the monocarboxylic fatty acid constituting the esters include monocarboxylic fatty acids having 1 to 20 carbon atoms, preferably 4 to 18 carbon atoms, and more preferably 4 to 12 carbon atoms. The di- to hexa-hydric alcohol constituting the ester is preferably neopentyl glycol, trimethylolpropane, pentaerythritol, dipentaerythritol, or the like. Examples of the ether include polyvinyl ether, polyalkylene glycol, polyphenyl ether, perfluoroether, and mixtures thereof.

The kinematic viscosity at 40° C. of the lubricating base oil is not particularly limited, and preferably 50 mm$^2$/s or less, and more preferably 20 mm$^2$/s or less, from the viewpoint of effectively reducing the friction coefficient in a region where the sliding speed is low, and further preferably 10 mm$^2$/s or less, and particularly preferably 5 mm$^2$/s or less, still more preferably 4 mm$^2$/s or less, from the viewpoint of significantly reducing the frictional resistance in the fluid lubrication region. The kinematic viscosity at 40° C. of the lubricating base oil is not particularly limited, and may be, for example, 1 mm$^2$/s or more. The kinematic viscosity at 100° C. of the lubricating base oil may be preferably 0.5 mm$^2$/s or more, more preferably 0.8 mm$^2$/s or more, still more preferably 1 mm$^2$/s or more. The kinematic viscosity at 100° C. of the lubricating base oil may be preferably 10 mm$^2$/s or less, more preferably 5 mm$^2$/s or less, still more preferably 3 mm$^2$/s or less, particularly preferably 2 mm$^2$/s or less or less than 2 mm$^2$/s. The kinematic viscosity in the present invention means a kinematic viscosity measured in accordance with JIS K2283:2000.

The content of the lubricating base oil may be 50% by mass or more, 60% by mass or more, 70% by mass or more, 80% by mass or more, or 90% by mass or more, based on the total amount of the refrigerating machine oil.

The refrigerating machine oil according to the present embodiment contains a polymer additive. The carbon residue of 10% residual oil of the refrigerating machine oil described below can be efficiently adjusted, and the friction characteristics of the refrigerating machine oil can be effectively improved, by the polymer additive. As described above, the lubricating base oil may contain base oil components such as PAO, PAG, and PVE, and in this case, the polymer additive is a polymer different from these base oil components. The polymer additive may consist of a single polymer or may contain a diluent oil or the like having a structure different from that of the polymer.

Specific examples of the polymer additive include at least one selected from a (co)polymer of an unsaturated carboxylic acid ester and a (co)polymer of another polymerizable unsaturated compound.

The (co)polymer of an unsaturated carboxylic acid ester is a (co)polymer containing an unsaturated carboxylic acid ester as an essential monomer, and is not particularly limited as long as it is a (co)polymer, and may be a polymer of only one unsaturated carboxylic acid esters, a copolymer of two or more unsaturated carboxylic acid esters, or a copolymer of one or two or more unsaturated carboxylic acid esters and another polymerizable unsaturated compound. Examples of the unsaturated carboxylic acid constituting the unsaturated carboxylic acid ester include unsaturated monocarboxylic acids such as acrylic acid, methacrylic acid and crotonic acid, and unsaturated dicarboxylic acids such as maleic acid, fumaric acid, citraconic acid, mesaconic acid and itaconic acid. Examples of the alcohol constituting the unsaturated carboxylic acid ester include alcohols having 1 to 20 carbon atoms, and these are usually monohydric alcohols having 1 to 20 carbon atoms, preferably monohydric alcohols having 1 to 8 carbon atoms, and more preferably monohydric alcohols having 4 to 8 carbon atoms, but may be polyhydric alcohols as well.

The other polymerizable unsaturated compound is not particularly limited, and examples thereof include unsaturated carboxylic acids or anhydrides thereof, which are exemplified as the unsaturated carboxylic acid constituting the above-described unsaturated carboxylic acid ester, and unsaturated hydrocarbon compounds having 2 to 20 carbon atoms such as α-olefins having 2 to 20 carbon atoms and styrene. Preferred examples of the copolymer of an unsaturated carboxylic acid ester and another polymerizable unsaturated compound include a copolymer of an unsaturated carboxylic acid ester and an α-olefin having 2 to 20 carbon atoms.

Specific examples of the (co)polymer of an unsaturated carboxylic acid ester in the present invention include a (co)polymer of an unsaturated carboxylic acid ester which has a structural unit represented by the formula (1).

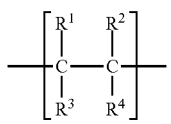

(1)

In the formula (1), $R^1$ and $R^2$ represent hydrogen or methyl group, at least one of $R^3$ and $R^4$ represents a group represented by $C(=O)OR^5$, and the other one of $R^3$ and $R^4$ represents hydrogen, a hydrocarbon group, or a group represented by $C(=O)OR^5$. Here, $R^5$ represents a hydrocarbon group or a group represented by $-(R^6)_a$-E or $-(R^7)$b-$R^8$, $R^6$ represents an alkylene group, preferably an alkylene group having 1 to 30 carbon atoms, E represents an amine residue or a heterocyclic residue containing preferably 1 to 2 nitrogen atoms and preferably 0 to 2 oxygen atoms, a represents an integer, preferably 0 or 1, $R^7$ represents an oxyalkylene group, preferably an oxyalkylene group having 1 to 4 carbon atoms, b represents an integer, preferably an integer of 1 to 10, and $R^8$ represents hydrogen or a hydrocarbon group, preferably hydrogen or an alkyl group having 1 to 8 carbon atoms.

The hydrocarbon group in the formula (1) is preferably a hydrocarbon group having 1 to 30 carbon atoms, more preferably an alkyl group, and examples thereof include a methyl group, an ethyl group, a propyl group, a butyl group, a pentyl group, a hexyl group, a heptyl group, an octyl group, a nonyl group, a decyl group, a decyl group, an undecyl group, a dodecyl group, a tridecyl group, a tetradecyl group, a pentadecyl group, a hexadecyl group, a heptadecyl group, an octadecyl group, an icosyl group, a docosyl group, a tetracosyl group, a hexacosyl group, and an octacosyl group (these alkyl groups may be linear or branched) and the like.

The alkylene group in the formula (1) is preferably an alkylene group having 1 to 30 carbon atoms, and examples thereof include a methylene group, an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group (these alkylene groups may be linear or branched) and the like.

When E is an amine residue, specific examples thereof include a dimethylamino group, a diethylamino group, a dipropylamino group, a dibutylamino group, an anilino group, a toluidino group, a xylidino group, an acetylamino group, and a benzoylamino group, and when E is a heterocyclic residue, specific examples thereof include a morpholino group, a pyrrolyl group, a pyrrolino group, a pyridyl group, a methylpyridyl group, a pyrrolidinyl group, a piperidinyl group, a quinonyl group, a pyrrolidonyl group, a pyrrolidono group, an imidazolino group, and a pyrazino group.

More specific preferred examples of the (co)polymer of an unsaturated carboxylic acid ester include a (co)polymer of a (meth)acrylic acid ester and a copolymer of an unsaturated carboxylic acid ester and an α-olefin, and a copolymer of an unsaturated carboxylic acid ester and an α-olefin is particularly preferred.

The (co)polymer of (meth)acrylic acid ester is a (co)polymer having a structural unit represented by the formula (1), wherein $R^1$ represents hydrogen, $R^2$ represents hydrogen or a methyl group, $R^3$ represents hydrogen, and $R^4$ represents a group represented by $C(=O)OR^5$. Here, $R^5$ represents a hydrocarbon group, or a group represented by $-(R^6)_a$-E or $-(R^7)$b-$R^8$, $R^6$ represents an alkylene group, preferably an alkylene group having 1 to 30 carbon atoms, E represents an amine residue or heterocyclic residue containing preferably 1 to 2 nitrogen atoms and preferably 0 to 2 oxygen atoms, a represents an integer, preferably 0 or 1, $R^7$ represents an oxyalkylene group, preferably an oxyalkylene group having 1 to 4 carbon atoms, b represents an integer, preferably an integer of 1 to 10, and $R^8$ represents hydrogen or a hydrocarbon group, preferably hydrogen or an alkyl group having 1 to 8 carbon atoms. The (co)polymer of a (meth)acrylic acid ester is preferably a copolymer of two or more selected from (meth)acrylic acid esters in which $R^1$ is hydrogen, $R^2$ is hydrogen or a methyl group, $R^3$ is hydrogen, $R^4$ is $C(=O)OR^5$, and $R^5$ is a hydrocarbon group.

More preferable examples of the copolymer of an unsaturated carboxylic acid ester and an α-olefin include a copolymer having a structural unit represented by the formula (1) and a structural unit represented by the formula (2).

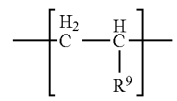

(2)

In the formula (1), $R^1$ and $R^2$ represent hydrogen or methyl group, at least one of $R^3$ and $R^4$ represents a group represented by $C(=O)OR^5$, and the other one of $R^3$ and $R^4$ represents hydrogen, a hydrocarbon group, or a group represented by $C(=O)OR^5$. Here, $R^5$ represents a hydrocarbon group, preferably a hydrocarbon group having 1 to 30 carbon atom, or a group represented by $-(R^6)_a$-E or $-(R^7)$b-$R^8$, $R^6$ represents an alkylene group, E represents an amine residue or a heterocyclic residue containing preferably 1 to 2 nitrogen atoms and preferably 0 to 2 oxygen atoms, a represents an integer, preferably 0 or 1, $R^7$ represents an oxyalkylene group, preferably an oxyalkylene group having 1 to 4 carbon atoms, b represents an integer, preferably an integer of 1 to 10, and $R^8$ represents hydrogen or a hydrocarbon group, preferably hydrogen or an alkyl group having 1 to 8 carbon atoms. $R^5$ may be preferably a hydrocarbon group having 1 to 20 carbon atoms, and more preferably a hydrocarbon group having 3 to 8 carbon atoms.

The copolymer of an unsaturated carboxylic acid ester and an α-olefin in the present invention is preferably at least one selected from a copolymer of a (meth)acrylic acid ester and an α-olefin and a copolymer of an unsaturated dicarboxylic acid ester and an α-olefin, and may be any of them, but is more preferably a copolymer of an unsaturated dicarboxylic acid ester and an α-olefin.

Specific examples of the unsaturated dicarboxylic acid include maleic acid, fumaric acid, citraconic acid, mesaconic acid, and itaconic acid.

Preferred examples of the unsaturated dicarboxylic acid ester include diesters of unsaturated dicarboxylic acids such as maleic acid, fumaric acid, citraconic acid, mesaconic acid, and itaconic acid with aliphatic alcohols having 3 to 8 carbon atoms such as propanol, butanol, pentanol, hexanol, heptanol, and octanol. Preferred examples of the maleic acid ester include dimethyl maleate, diethyl maleate, dipropyl maleate, dibutyl maleate, dipentyl maleate, dihexyl maleate, diheptyl maleate, and dioctyl maleate.

$R^9$ in the formula (2) is preferably a hydrogen or a hydrocarbon group having 1 to 18 carbon atoms, more preferably alkyl groups having 1 to 18 carbon atoms, and still more preferably alkyl groups having 4 to 16 carbon atoms. The structural unit of the formula (2) is derived from an α-olefin, and specific examples of the α-olefin include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene.

The molar ratio of the α-olefin:the carboxylic acid ester when producing the copolymer of the unsaturated carboxylic acid ester and the α-olefin is not particularly limited, but is preferably 1:9 to 9:1, and more preferably 3:7 to 7:3.

The number average molecular weight (Mn) of the polymer additive is preferably 300 or more, more preferably 1000 or more, and still more preferably 1500 or more, and is preferably 500000 or less, more preferably 50000 or less, and still more preferably 30000 or less, and may be 20000 or less or 15000 or less.

The weight average molecular weight (Mw) of the polymer additive is preferably 400 or more, more preferably 2000 or more, and still more preferably 3000 or more, and is preferably 1000000 or less, more preferably 100000 or less, and still more preferably 50000 or less, and may be 30000 or less, 20000 or less, or 15000 or less.

The Mw/Mn value of the polymer additive is preferably 1.2 or more, more preferably 1.5 or more, still more preferably 1.7 or more, and particularly preferably 2 or more, and is preferably 5 or less, more preferably 3.5 or less, and may be 3 or less.

In the present specification, "number average molecular weight (Mn)" and "weight average molecular weight (Mw)" mean a polystyrene-equivalent number average molecular weight and weight average molecular weight determined by gel permeation chromatography (GPC) (standard substance: polystyrene) using an APC XT column manufactured by Waters Corporation as a column and tetrahydrofuran as a mobile phase. In the measurement of the average molecular weight, when the polymer additive contains a third component such as a diluent oil having a different structure other than the polymer, the average molecular weight means a value measured by excluding the third component.

The kinematic viscosity at 100° C. of the polymer additive is preferably 10 mm$^2$/s or more, more preferably 20 mm$^2$/s or more, and still more preferably 100 mm$^2$/s or more, and is preferably 10000 mm$^2$/s or less, more preferably 1000 mm$^2$/s or less, and still more preferably 800 mm$^2$/s or less, and may be 500 mm$^2$/s or less.

The kinematic viscosity at 40° C. of the polymer additive is preferably 100 mm$^2$/s or more, more preferably 200 mm$^2$/s or more, and still more preferably 400 mm$^2$/s or more than 400 mm$^2$/s, and may be 500 mm$^2$/s or more or 1000 mm$^2$/s or more, and is preferably 100000 mm$^2$/s or less, more preferably 20000 mm$^2$/s or less, and still more preferably 15000 mm$^2$/s or less, and may be 10000 mm$^2$/s or less or 5000 mm$^2$/s or less.

The viscosity index of the polymer additive is preferably 80 or more, more preferably 140 or more, may be 180 or more or 200 or more, and is preferably 400 or less, more preferably 300 or less, and may be 250 or less.

The polymer additive preferably has a carbon residue in the specific range when evaporated and thermally decomposed, and the reason is unknown but is presumed that the presence of the precursor can reduce the friction coefficient in a specific sliding speed region. The carbon residue of the polymer additive is, for example, 0.2% by mass or more, preferably 0.5% by mass or more, more preferably 1% by mass or more, and still more preferably 1.5% by mass or more, may be 2% by mass or more or 2.5% by mass or more, and is preferably 10% by mass or less, more preferably 5% by mass or less, and still more preferably 4% by mass or less, and may be 3.5% by mass or less.

The carbon residue of the polymer additive in the present specification means a carbon residue measured by a micro method in accordance with JIS K2270-2:2009.

The ratio of the carbon residue (% by mass) to the kinematic viscosity at 100° C. (mm$^2$/s) of the polymer additive is preferably 0.001 or more, more preferably 0.002 or more, and is preferably 0.1 or less, more preferably 0.05 or less. When the ratio is within the above range, the addition of a small amount of the polymer additive can suppress the increase in viscosity of the refrigerating machine oil and effectively exhibit the effect of reducing the friction coefficient.

By applying the polymer additive as described above, it is possible to effectively reduce the friction coefficient at each sliding speed of the refrigerating machine oil of the present invention and the friction coefficient in a predetermined sliding speed region, particularly in an elastic fluid lubrication region or a mixed lubrication region where the friction coefficient rapidly increases.

The content of the polymer additive based on the total amount of the refrigerating machine oil is not particularly limited, but is preferably 0.1% by mass or more, more preferably 0.5% by mass or more, and still more preferably 0.8% by mass or more, from the viewpoint of further improving the friction characteristics of the refrigerating machine oil, and is preferably 10% by mass or less, more preferably 5% by mass or less, still more preferably 3% by mass or less, and still more preferably 2% by mass or less, and may be 1.5% by mass or less, 1% by mass or less, or less than 1% by mass, from the viewpoint of suppressing an increase in viscosity of the refrigerating machine oil and maintaining a low friction coefficient even in a region where the sliding speed is relatively high. The polymer additive may be a single polymer or may contain a third component such as a diluent oil having a structure different from that of the polymer. In this case, the preferable range of the content of the polymer additive described above can be read as the preferable range of the content of the polymer.

The refrigerating machine oil according to the present embodiment may further contain additional additives in addition to the components described above within a range in which the effects of the present invention are not significantly impaired. Examples of the additional additives include antioxidants, acid scavengers, extreme pressure agents, metal deactivators, antiwear agents, pour point depressants, and detergent dispersants. The content of these additives may be 10% by mass or less or 5% by mass or less based on the total amount of the refrigerating machine oil.

Examples of the antioxidant include a phenol-based antioxidant and an amine-based antioxidant. Examples of the phenol-based antioxidant include 2,6-di-tert.-butyl-p-cresol (DBPC), 2,6-di-tert.-butyl-phenol, and 4,4'-methylene bis(2,6-di-tert.-butyl-phenol). Examples of the amine-based antioxidant include phenyl-α-naphthylamines and dialkylated diphenylamines. These antioxidants may be used alone or in combination of two or more thereof. The content of the antioxidant is, for example, 0.01 to 5% by mass and preferably 0.1 to 3% by mass, based on the total amount of the refrigerating machine oil.

Examples of the acid scavenger include epoxy compounds (epoxy-based acid scavengers). Examples of the epoxy compound include glycidyl ether type epoxy compounds, glycidyl ester type epoxy compounds, aryloxirane compounds, alkyloxirane compounds, cycloaliphatic epoxy compounds, epoxidized fatty acid monoesters, and epoxidized vegetable oils. These acid scavengers can be used alone or in combination of two or more. The content of the acid scavenger is, for example, 0.01 to 5% by mass and preferably 0.1 to 3% by mass, based on the total amount of the refrigerating machine oil.

Examples of the extreme pressure agent include phosphorus based extreme pressure agents. Examples of the phosphorus based extreme pressure agent include phosphoric acid esters, acidic phosphoric acid esters, amine salts of acidic phosphoric acid esters, chlorinated phosphoric acid esters, phosphorous acid esters, and phosphorothionates. The phosphoric acid ester is preferably triphenyl phosphate (TPP), tricresyl phosphate (TCP), or triphenyl phosphorothionate (TPPT). These extreme pressure agents may be used alone or in combination of two or more. The content of the extreme pressure agent is, for example, 0.01 to 5% by mass and preferably 0.1 to 3% by mass, based on the total amount of the refrigerating machine oil.

The carbon residue of 10% residual oil of the refrigerating machine oil is 0.05% by mass or more, preferably 0.10% by mass or more, more preferably 0.15% by mass or more, and may be 0.20% by mass or more, or more than 0.20% by mass. The upper limit of the carbon residue of 10% residual oil of the refrigerating machine oil may be, for example, 0.6% by mass or less, or 0.4% by mass or less, from the viewpoint of the balance between the friction reduction effect and the reduction in viscosity by the polymer additive. The carbon residue of 10% residual oil in the present invention means a carbon residue of 10% residual oil measured by a micro method in accordance with JIS K2270-2: 2009.

The kinematic viscosity at 40° C. of the refrigerating machine oil is not particularly limited, but is preferably 50 mm$^2$/s or less, and more preferably 20 mm$^2$/s or less, and from the viewpoint of more effectively reducing the friction coefficient, is preferably 10 mm$^2$/s or less, more preferably 5 mm$^2$/s or less, and still more preferably 4 mm$^2$/s or less. The lower limit of the kinematic viscosity at 40° C. of the refrigerating machine oil is not particularly limited, and may be, for example, 1 mm$^2$/s or more, or 2 mm$^2$/s or more. The kinematic viscosity at 100° C. of the refrigerating machine oil may be preferably 0.5 mm$^2$/s or more, more preferably 0.8 mm$^2$/s or more, and still more preferably 1 mm$^2$/s or more. The kinematic viscosity at 100° C. of the refrigerating machine oil may be preferably 10 mm$^2$/s or less, more preferably 5 mm$^2$/s or less, and still more preferably 3 mm$^2$/s or less, or 2 mm$^2$/s or less.

In the method for producing the refrigerating machine oil according to the present embodiment, the polymer additive may be mixed with the lubricating base oil such that the carbon residue of 10% residual oil of the refrigerating machine oil is 0.05% by mass or more. In the refrigerating machine oil according to the present embodiment, the ratio of the kinematic viscosity at 40° C. of the refrigerating machine oil before and after blending the polymer additive (kinematic viscosity at 40° C. after blending the polymer additive (Va)/kinematic viscosity at 40° C. before blending the polymer additive (Vb)) is preferably 1.01 or more, more preferably 1.02 or more, and preferably 1.5 or less, more preferably 1.2 or less, still more preferably 1.1 or less, particularly preferably 1.08 or less. It is possible to obtain a refrigerating machine oil capable of maintaining a relatively low friction coefficient even in a fluid lubrication region while reducing a friction coefficient in an elastic fluid lubrication region or a mixed lubrication region by suppressing thickening caused by the polymer additive to be low.

The kinematic viscosity at 40° C. before blending the polymer additive (Vb) can be read as the kinematic viscosity at 40° C. of the lubricating base oil described above, and the kinematic viscosity at 40° C. after blending the polymer additive (Va) can be read as the kinematic viscosity at 40° C. of the refrigerating machine oil described above. In the present embodiment, it is particularly preferable that the Va is 1 mm$^2$/s or more and 4 mm$^2$/s or less, and the Va/Vb ratio is 1.01 or more and 1.2 or less.

The viscosity index of the refracting machine oil may be −50 or moe, preferably 0 or more, more preferably 50 or more, and may be 200 or less. The viscosity index in the present invention means a viscosity index measured in accordance with JIS K2283:2000.

The pour point of the refracting machine oil may be preferably −10° C. or lower, more preferably −20° C. or lower. The pour point in the present invention means a pour point measured in accordance with JIS K2269: 1987.

The volume resistivity of the refrigerating machine oil may be preferably $1.0 \times 10^9$ Ω·m or more, more preferably $1.0 \times 10^{10}$ Ω·m or more, and still more preferably $1.0 \times 10^{11}$ Ω·m or more. The volume resistivity in the present invention means a volume resistivity at 25° C. measured in accordance with JIS C2101:1999.

The moisture content of the refrigerating machine oil may be preferably 200 ppm or less, more preferably 100 ppm or less, and still more preferably 50 ppm or less, based on the total amount of the refrigerating machine oil.

The acid value of the refrigerating machine oil may be preferably 1.0 mgKOH/g or less, more preferably 0.1 mgKOH/g or less. The hydroxyl value of the refrigerating machine oil is, for example, 10 mgKOH/g or more, preferably 5 mgKOH/g or less, more preferably 2 mgKOH/g or less.

The ash content of the refrigerating machine oil may be preferably 100 ppm or less, more preferably 50 ppm or less. The ash content in the present invention means an ash content measured in accordance with JIS K2272:1998.

The low-temperature side two layer separation temperature of the refrigerating machine oil and the refrigerant is, for example, preferably 10° C. or lower, more preferably 0° C. or lower, still more preferably −20° C. or lower, and may be −30° C. or lower, when the oil rate (refrigerating machine oil collection amount (g)/total collection amount of refrigerating machine oil and refrigerant (g)×100) (%) is 20%. Examples of the refrigerant include hydrocarbon refrigerants such as propane and isobutane.

The refrigerating machine oil according to the present embodiment is usually mixed with a refrigerant and present in the form of a working fluid composition for a refrigerating machine, and lubricates a refrigerating machine including a refrigerant circulation system having a compressor, a condenser, an expansion mechanism, and an evaporator. That is, the working fluid composition for a refrigerating machine according to the present embodiment contains the refrigerating machine oil and a refrigerant. The lubricating method according to the present embodiment uses the refrigerating machine oil in the refrigerant circulation system. The content of the refrigerating machine oil in the working fluid composition for a refrigerating machine may be 1 to 500 parts by mass or 2 to 400 parts by mass, with respect to 100 parts by mass of the refrigerant.

Examples of the refrigerant include a hydrocarbon refrigerant, a saturated hydrofluorocarbon refrigerant, an unsaturated hydrofluorocarbon refrigerant, a fluorine-containing ether refrigerant such as perfluoroethers, a bis(trifluoromethyl)sulfide refrigerant, a trifluoroiodomethane refrigerant, and a natural refrigerant such as ammonia and carbon dioxide.

The hydrocarbon refrigerant is preferably a hydrocarbon having 1 to 5 carbon atoms, more preferably a hydrocarbon having 2 to 4 carbon atoms. Examples of the hydrocarbon include methane, ethylene, ethane, propylene, propane (R290), cyclopropane, normal butane, isobutane (R600a), cyclobutane, methylcyclopropane, 2-methylbutane, normal pentane, and a mixture of two or more thereof. Among them, the hydrocarbon refrigerant is preferably a hydrocarbon refrigerant that is gaseous at 25° C. and 1 atm, and more preferably propane, normal butane, isobutane, 2-methylbutane or a mixture thereof is preferably used.

The saturated hydrofluorocarbon refrigerant is a saturated hydrofluorocarbon having preferably 1 to 3 carbon atoms, more preferably 1 to 2 carbon atoms. Examples of the saturated hydrofluorocarbon refrigerant include difluoromethane (R32), trifluoromethane (R23), pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245fa), and 1,1,1,3,3-pentafluorobutane (R365mfc), or a mixture of two or more thereof.

The saturated hydrofluorocarbon refrigerant is appropriately selected from the above depending on the application and the required performance. Examples of the saturated hydrofluorocarbon refrigerant include R32 alone; R23 alone; R134a alone; R125 alone; a mixture of R134a/R32 of 60 to 80% by mass/40 to 20% by mass; a mixture of R32/R125 of 40 to 70% by mass/60 to 30% by mass; a mixture of R125/R143a of 40 to 60% by mass/60 to 40% by mass; a mixture of R134a/R32/R125 of 60 by mass/30% by mass/10% by mass; a mixture of R134a/R32/R125 of 40 to 70% by mass/15 to 35% by mass/5 to 40% by mass; and a mixture of R125/R134a/R143a of 35 to 55% by mass/1 to 15% by mass/40 to 60% by mass. More specific examples of the saturated hydrofluorocarbon refrigerant include a mixture of R134a/R32 of 70/30% by mass; a mixture of R32/R125 of 60/40% by mass; a mixture of R32/R125 of 50/50% by mass (R410A); a mixture of R32/R125 of 45/55% by mass (R410B); a mixture of R125/R143a of 50/50% by mass (R507C); a mixture of R32/R125/R134a of 30/10/60% by mass; a mixture of R32/R125/R134a of 23/25/52% by mass (R407C); a mixture of R32/R125/R134a of 25/15/60% by mass (R407E); and a mixture of R125/R134a/R143a of 44/4/52% by mass (R404A).

The unsaturated hydrofluorocarbon (HFO) refrigerant is preferably an unsaturated hydrofluorocarbon refrigerant having 2 to 3 carbon atoms, more preferably a fluoropropene, still more preferably a fluoropropene having 3 to 5 fluorine atoms. The unsaturated hydrofluorocarbon refrigerant is preferably any one of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf), or a mixture of two or more thereof. The unsaturated hydrofluorocarbon refrigerant is preferably one or two or more selected from HFO-1225ye, HFO-1234ze and HFO-1234yf are preferable from the viewpoint of the physical properties of the refrigerant. The unsaturated hydrofluorocarbon refrigerant may be a fluoroethylene, and is preferably 1,1,2-trifluoroethylene.

Examples

Hereinafter, the present invention will be described more specifically based on Examples, but the present invention is not limited to the following Examples.
(Lubricating Base Oil)

The following base oil A was used as the lubricating base oil.

A: paraffin mineral oil-based base oil (kinematic viscosity at 40° C.: 3.2 mm$^2$/s, kinematic viscosity at 100° C.: 1.3 mm$^2$/s, pour point: −30° C., flash point (COC): 130° C., % $C_P$/% $C_N$=1.2)
(Refrigerating Machine Oil)

In Examples and Comparative Examples, the lubricating base oil and the following polymer additives as additive were used to prepare refrigerating machine oils having the composition (% by mass based on the total amount of the refrigerating machine oil) shown in Tables 1, 2, and 3. These polymer additives contained, for example, 5 to 20% by mass of the diluent oil.
Polymer additive 1: copolymer of maleic acid ester and α-olefin (kinematic viscosity at 40° C.: 1980 mm$^2$/s, kinematic viscosity at 100° C.: 200 mm$^2$/s, viscosity index: 227, Mn of polymer: 4500, Mw/Mn: 2.2, carbon residue: 3.1% by weight, value of carbon residue (% by weight)/value of kinematic viscosity at 100° C. (mm$^2$/s): 0.016)
Polymer additive 2: copolymer of maleic acid ester and α-olefin (kinematic viscosity at 40° C.: 4100 mm$^2$/s, kinematic viscosity at 100° C.: 260 mm$^2$/s, viscosity index: 190, Mn of polymer: 1800, Mw/Mn: 2.7, carbon residue: 2.8% by weight, value of carbon residue (% by weight)/value of kinematic viscosity at 100° C. (mm$^2$/s): 0.011)
Polymer additive 3: copolymer of maleic acid ester and α-olefin (kinematic viscosity at 40° C.: 4300 mm$^2$/s, kinematic viscosity at 100° C.: 300 mm$^2$/s, viscosity index: 225, Mn of polymer: 2000, Mw/Mn: 2.5, carbon residue: 1.7% by weight, value of carbon residue (% by weight)/value of kinematic viscosity at 100° C. (mm$^2$/s): 0.006)
Polymer additive 4: copolymer of maleic acid ester and α-olefin (kinematic viscosity at 40° C.: 7000 mm$^2$/s, kinematic viscosity at 100° C.: 500 mm$^2$/s, viscosity index: 230, Mn of polymer: 2650, Mw/Mn: 4.0, carbon residue: 2% by weight, value of carbon residue (% by weight)/value of kinematic viscosity at 100° C. (mm$^2$/s): 0.004)
Polymer additive 5: copolymer of maleic acid ester and α-olefin (kinematic viscosity at 40° C.: 11000 mm$^2$/s, kinematic viscosity at 100° C.: 700 mm$^2$/s, viscosity index: 250, Mn of polymer: 2690, Mw/Mn: 3.1, carbon residue: 1.5% by weight, value of carbon residue (% by weight)/value of kinematic viscosity at 100° C. (mm$^2$/s): 0.002)
Polymer additive 6: a copolymer of a maleic acid ester and an α-olefin (kinematic viscosity at 40° C.: 400 mm$^2$/s, kinematic viscosity at 100° C.: 40 mm$^2$/s, viscosity index: 160, carbon residue: 0.8% by weight, value of carbon residue (% by weight)/value of kinematic viscosity at 100° C. (mm$^2$/s): 0.02)

Polymer additive 7: copolymer of (meth)acrylic acid esters (kinematic viscosity at 100° C.: 600 mm²/s, Mn of polymer: 25000, Mw/Mn: 1.4, carbon residue: 1.1% by weight, value of carbon residue (% by weight)/value of kinematic viscosity at 100° C. (mm²/s): 0.002)

Polymer additive 8: copolymer of (meth)acrylic acid esters (kinematic viscosity at 100° C.: 370 mm²/s, Mn of polymer: 25900, Mw/Mn: 1.3, carbon residue: 1.1% by weight, value of carbon residue (% by weight)/value of kinematic viscosity at 100° C. (mm²/s): 0.003)

Polymer additive 9: copolymer of (meth)acrylic acid esters (kinematic viscosity at 100° C.: 180 mm²/s, Mn of polymer: 3620, Mw/Mn: 2.0, carbon residue: 1.3% by weight, value of carbon residue (% by weight)/value of kinematic viscosity at 100° C. (mm²/s): 0.007)

Polymer additive 10: copolymer of (meth)acrylic acid esters (kinematic viscosity at 100° C.: 360 mm²/s, Mn of polymer: 11000, Mw/Mn: 1.6, carbon residue: 0.9% by weight, value of carbon residue (% by weight)/value of kinematic viscosity at 100° C. (mm²/s): 0.003)

Polymer additive 11: copolymer of (meth)acrylic acid esters (kinematic viscosity at 100° C.: 380 mm²/s, Mn of polymer: 22500, Mw/Mn: 1.5, carbon residue: 0.1% by weight, value of carbon residue (% by weight)/value of kinematic viscosity at 100° C. (mm²/s): 0.0003)

(Evaluation of Friction Characteristics)

In order to evaluate the friction characteristics of each of the refrigerating machine oils of Examples and Comparative Examples, the following tests were performed.

The friction coefficient ($\mu$) in the lubrication region corresponding to the elastic fluid lubrication region or the mixed lubrication region was measured under the following conditions using an MTM (Mini Traction Machine) tester (manufactured by PCS Instruments) under the following conditions. The results are shown in Tables 1, 2 and 3. The smaller the friction coefficient is, the more excellent the friction characteristics are.

Ball and disc: standard test piece (AISI52100 standard)
Test temperature: 40° C.
Sliding speed: 0.0006 to 0.9 m/s (partially extracted)
Applied load: 10N
Sliding ratio: 30%

The sliding speed was a value of $|U_D-U_B|$ (m/s). Here, $U_D$ is the velocity (m/s) of the disk in the sliding portion, and $U_B$ is the velocity (m/s) of the ball in the sliding portion.

Further, using Comparative Example 1 containing no polymer additive as a reference sample, the change rate (%) of the friction coefficient at each sliding speed was calculated using the following formula:

Change rate (%)=(friction coefficient of sample−friction coefficient of reference sample)/friction coefficient of reference sample×100 and the average value of the change rates (%) at sliding speeds of 0.03, 0.09, 0.15, and 0.3 (average change rate of the friction coefficient (%)) was calculated. The results are shown in Tables 1, 2 and 3.

TABLE 1

| | | Example 1 | Example 2 | Example 3 | Example 4 | Example 5 |
|---|---|---|---|---|---|---|
| Lubricating base oil | % by mass | 99.0 | 99.0 | 99.0 | 99.0 | 99.0 |
| Polymer additive | % by mass | 1.0 | 1.0 | 1.0 | 1.0 | 1.0 |
| Type of polymer | | (1) | (2) | (3) | (4) | (5) |
| Kinematic viscosity at 40° C. | mm²/s | 3.3 | 3.3 | 3.3 | 3.3 | 3.3 |
| Carbon residue of 10% residual oil | % by mass | 0.31 | 0.28 | 0.17 | 0.20 | 0.15 |
| Friction coefficient | Sliding speed m/s | | | | | |
| | 0.9 | 0.016 | 0.016 | 0.016 | 0.017 | 0.016 |
| | 0.3 | 0.017 | 0.017 | 0.016 | 0.017 | 0.017 |
| | 0.15 | 0.020 | 0.019 | 0.020 | 0.020 | 0.020 |
| | 0.09 | 0.026 | 0.025 | 0.027 | 0.027 | 0.025 |
| | 0.03 | 0.049 | 0.057 | 0.063 | 0.063 | 0.059 |
| Average change rate of friction coefficient (based on lucricating base oil, %) | Sliding speed m/s 0.03-0.3 m/s | −17.4 | −16.7 | −11.9 | −11.0 | −14.0 |

TABLE 2

| | | Example 6 | Example 7 | Example 8 | Example 9 | Example 10 |
|---|---|---|---|---|---|---|
| Lubricating base oil | % by mass | 99.0 | 99.0 | 99.0 | 99.0 | 99.0 |
| Polymer additive | % by mass | 1.0 | 1.0 | 1.0 | 1.0 | 1.0 |
| Type of polymer | | (6) | (7) | (8) | (9) | (10) |
| Kinematic viscosity at 40° C. | mm²/s | 3.3 | 3.3 | 3.3 | 3.3 | 3.3 |
| Carbon residue of 10% residual oil | % by mass | 0.08 | 0.11 | 0.11 | 0.13 | 0.09 |
| Friction coefficient | Sliding speed m/s | | | | | |
| | 0.9 | 0.016 | 0.016 | 0.016 | 0.016 | 0.016 |
| | 0.3 | 0.016 | 0.017 | 0.016 | 0.017 | 0.017 |
| | 0.15 | 0.018 | 0.022 | 0.020 | 0.023 | 0.023 |
| | 0.09 | 0.024 | 0.028 | 0.027 | 0.029 | 0.030 |
| | 0.03 | 0.058 | 0.055 | 0.059 | 0.050 | 0.058 |
| Average change rate of friction coefficient (based on lucricating base oil, %) | Sliding speed m/s 0.03-0.3 m/s | −18.4 | −10.8 | −13.5 | −10.5 | −7.6 |

TABLE 3

|  |  | Comprative Example 1 | Comparative Example 2 |
|---|---|---|---|
| Lubricating base oil | % by mass | 100 | 99.0 |
| Polymer additive | % by mass | — | 1.0 |
| Type of polymer |  | — | (11) |
| Kinematic viscosity at 40° C. | mm$^2$/s | 3.2 | 3.3 |
| Carbon residue of 10% residual oil | % by mass | 0.01 | 0.01 |
| Friction coefficient | Sliding speed m/s |  |  |
|  | 0.3 | 0.018 | 0.020 |
|  | 0.15 | 0.024 | 0.026 |
|  | 0.09 | 0.033 | 0.035 |
|  | 0.03 | 0.064 | 0.065 |
| Average change rate of friction coefficient (based on lucricating base oil, %) | Sliding speed m/s 0.03-0.3 m/s | Reference | 5.8 |

(Compatibility Test)

In accordance with "Refrigerant Compatibility Test Method" of JIS K2211:2009 "Refrigerating Machine Oil", R600a (isobutane) or 8290 (propane) and each of the refrigerating machine oils of Examples 1 to 10 were measured for the low-temperature side two layer separation temperature when the oil rate (refrigerating machine oil collection amount (g)/total collection amount of refrigerating machine oil and refrigerant (g)×100) (%) was 20%. The two layer separation temperatures of the Examples were −30° C. or lower, and it was confirmed that there was no problem in refrigerant compatibility.

The invention claimed is:

1. A refrigerating machine oil comprising:
   a lubricating base oil comprising a mineral oil; and
   a polymer additive, and
   the refrigerating machine oil being used with a refrigerant, wherein:
   a carbon residue of 10% residual oil of the refrigerating machine oil is 0.05% by mass or more, as measured in accordance with micro method in accordance with JIS K2270-2:2009;
   the polymer additive is a copolymer of only a maleic acid ester and an α-olefin, and has a ratio of a carbon residue (% by mass) to a kinematic viscosity at 100° C. (mm$^2$/s) of 0.011 to 0.02;
   the maleic acid ester is an ester of maleic acid with an aliphatic alcohol having 3 to 8 carbon atoms; and
   a content of the polymer additive is 0.8% by mass or more and 3% by mass or less based on the total amount of the refrigerating machine oil.

2. The refrigerating machine oil according to claim 1, wherein the polymer additive has a carbon residue of 0.2% by mass or more, as measured in accordance with micro method in accordance with JIS K2270-2:2009.

3. A working fluid composition for a refrigerating machine comprising:
   a refrigerant; and
   the refrigerating machine oil according to claim 1.

4. A lubricating method comprising using the refrigerating machine oil according to claim 1 in a refrigerant circulation system comprising a compressor, a condenser, an expansion mechanism, and an evaporator.

5. A method for producing a refrigerating machine oil, comprising mixing a polymer additive with a lubricating base oil comprising a mineral oil, the refrigerating machine oil being used with a refrigerant;
   wherein:
   a carbon residue of 10% residual oil of the refrigerating machine oil is 0.05% by mass or more, as measured in accordance with micro method in accordance with JIS K2270-2:2009;
   the polymer additive is a copolymer of only a maleic acid ester and an α-olefin, and has a ratio of a carbon residue (% by mass) to a kinematic viscosity at 100° C. (mm$^2$/s) of 0.011 to 0.02;
   the maleic acid ester is an ester of maleic acid with an aliphatic alcohol having 3 to 8 carbon atoms; and
   a content of the polymer additive is 0.8% by mass or more and 3% by mass or less based on the total amount of the refrigerating machine oil.

6. The refrigerating machine oil according to claim 1, wherein the polymer additive has an Mw/Mn of 1.7 or more and 3.5 or less.

7. The method for producing a refrigerating machine oil according to claim 5, wherein the polymer additive has an Mw/Mn of 1.7 or more and 3.5 or less.

* * * * *